(12) United States Patent
Lissack

(10) Patent No.: US 10,547,699 B2
(45) Date of Patent: Jan. 28, 2020

(54) METHODS AND APPARATUS FOR STATISTICAL MOBILE DEVICE IDENTIFICATION

(71) Applicant: AppNexus Inc., New York, NY (US)

(72) Inventor: Yaron Lissack, Great Neck, NY (US)

(73) Assignee: Xandr Inc., New York, NY (US)

( * ) Notice: Subject to any disclaimer, the term of this patent is extended or adjusted under 35 U.S.C. 154(b) by 156 days.

(21) Appl. No.: 14/550,287

(22) Filed: Nov. 21, 2014

(65) Prior Publication Data

US 2015/0142564 A1    May 21, 2015

Related U.S. Application Data

(60) Provisional application No. 61/907,154, filed on Nov. 21, 2013.

(51) Int. Cl.
*H04L 29/08* (2006.01)
*G06Q 30/02* (2012.01)

(52) U.S. Cl.
CPC ......... *H04L 67/22* (2013.01); *G06Q 30/0255* (2013.01)

(58) Field of Classification Search
CPC ... H04L 63/166; H04L 63/1408; H04L 67/14; G06Q 30/0255
USPC ...................................................... 705/14.53
See application file for complete search history.

(56) References Cited

U.S. PATENT DOCUMENTS

| | | | | |
|---|---|---|---|---|
| 7,778,194 B1 * | 8/2010 | Yung | .................. | H04L 12/2602 370/235 |
| 8,438,184 B1 * | 5/2013 | Wang | ..................... | H04L 67/02 707/780 |
| 2002/0004733 A1 * | 1/2002 | Addante | ................ | G06Q 30/02 705/14.51 |
| 2008/0021949 A1 * | 1/2008 | John | ...................... | H04L 67/24 709/200 |
| 2008/0209518 A1 | 8/2008 | Sturges et al. | | |

(Continued)

FOREIGN PATENT DOCUMENTS

GB    2494128 A    3/2013

OTHER PUBLICATIONS

International Search Report and Written Opinion for International Patent Application No. PCT/US2014/066863 dated Mar. 5, 2015 (10 pages).

(Continued)

*Primary Examiner* — Douglas B Blair
*Assistant Examiner* — Jonathan A Sparks
(74) *Attorney, Agent, or Firm* — Guntin & Gust, PLC; Atanu Das

(57) ABSTRACT

Methods and apparatus for mobile device identification using TCP segment timestamps are disclosed. A request from a mobile device is received at a server. A TCP connection, initiated by the mobile device, is made between the server and the device, and a timestamp generated by the mobile device is retrieved from the options field of the TCP SYN segment. Other identifying information is received from the mobile device source, including an IP address, port, and HTTP headers. Based on the identifying information, the mobile device timestamp, and a current timestamp generated by the server, a likelihood is determined that the particular mobile device previously communicated with the server.

21 Claims, 3 Drawing Sheets

(56) References Cited

U.S. PATENT DOCUMENTS

2014/0330982 A1* 11/2014 Jalan ................... H04L 63/0892
709/229
2016/0212032 A1* 7/2016 Tsuruoka .............. H04L 43/106

OTHER PUBLICATIONS

Poon, K., et al., (Oct. 24, 2014) "Use of TCP timestamp option to defend against blind spoofing attack: draft-ppon-tcp-tstamp-mod.01.txt.", The Internet Society, (26 pages).

* cited by examiner

ME THODS AND APPARATUS FOR STATISTICAL MOBILE DEVICE IDENTIFICATION

CROSS-REFERENCE TO RELATED APPLICATION

This application claims priority to and the benefit of U.S. Provisional Patent Application No. 61/907,154, filed on Nov. 21, 2013, and entitled "Methods and Apparatus for Statistical Mobile Device Identification," the entirety of which is incorporated by reference herein.

BACKGROUND

The present disclosure relates generally to device identification and, more particularly, to systems and methods for consistent identification of a mobile device based on timestamp-derived statistical connections.

Applications on devices such as smartphones, tablets, and set top boxes that engage in web communication typically have an independent cookie manager, or "cookie jar," that is not shared among the various applications on a particular device. Because one application is not able to access the cookies of another application, cookie jars greatly inhibit the use of cookies to recognize a device that has been previously identified. Consumers frequently interact with their devices using different native applications and embedded web browsers. Existing solutions, however, are unable to uniquely identify a device across all applications and web browsers without requiring modifications to such applications or to URLs that serve content to the device.

BRIEF SUMMARY

Implementations of the present invention provide methods and apparatus for statistical mobile device identification, in which a statistical connection is created among the native applications of a mobile device, including native web browsers, for the purpose of identifying the device. The statistical connection can be derived using timestamps (e.g., in TCP segment timestamp fields) from a source (e.g., a mobile device) and a target (e.g., an advertising server). A TCP connection to the advertising server can be initiated by the mobile device (e.g., to request an advertisement to be served to the mobile device), and a timestamp generated by the mobile device can be retrieved from the options field of the TCP SYN segment. Other identifying information can be received from the mobile device source, such as an IP address, source and/or destination port, HTTP headers, and device-type unique identifiers, such as device pixel ratio, screen height and width, and locale information. Based on the identifying information, the mobile device timestamp, and a current timestamp generated by the advertising server, the server can determine a likelihood that the same mobile device previously made one or more advertisement calls to the advertising server.

Accordingly, in one aspect, a method for statistical device identification includes the steps of: receiving, at a server, a request to establish a connection with a source device; receiving identifying information associated with the source device, the identifying information comprising a timestamp generated by the source device; and determining, based on the identifying information and a current timestamp of the server, a likelihood that a previous connection was made between the source device and the server. The source device can be a mobile device.

In one implementation, the identifying information is provided in one or more TCP header fields. The identifying information can also be provided in one or more TCP SYN packets. The identifying information can include at least one of an IP address, a port number, a plurality of HTTP headers, and a plurality of device-type unique identifiers.

In a further implementation, the method includes the steps of: generating a device identifier based on at least one of the HTTP headers and at least one of the device-type unique identifiers; and storing the identifying information and the current timestamp in association with the device identifier. The method can also include storing records of previously established connections, each record comprising a device identifier, a timestamp generated by the source of the call, and a timestamp generated by the server in response to receiving the request, and determining the likelihood can comprise, for each record having a device identifier equal to the generated device identifier, determining whether an alignment between the timestamps associated with the record and the timestamps associated with the current call exceeds a threshold value.

In another implementation, the server comprises an advertising server; the request to establish a connection comprises a request for an advertisement to be served; and the likelihood that a previous connection was made comprises a likelihood that a previous request for an advertisement to be served was received from the source device.

Other implementations of the foregoing aspects include corresponding systems and computer programs. The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings, in which.

DETAILED DESCRIPTION

Figure 1:
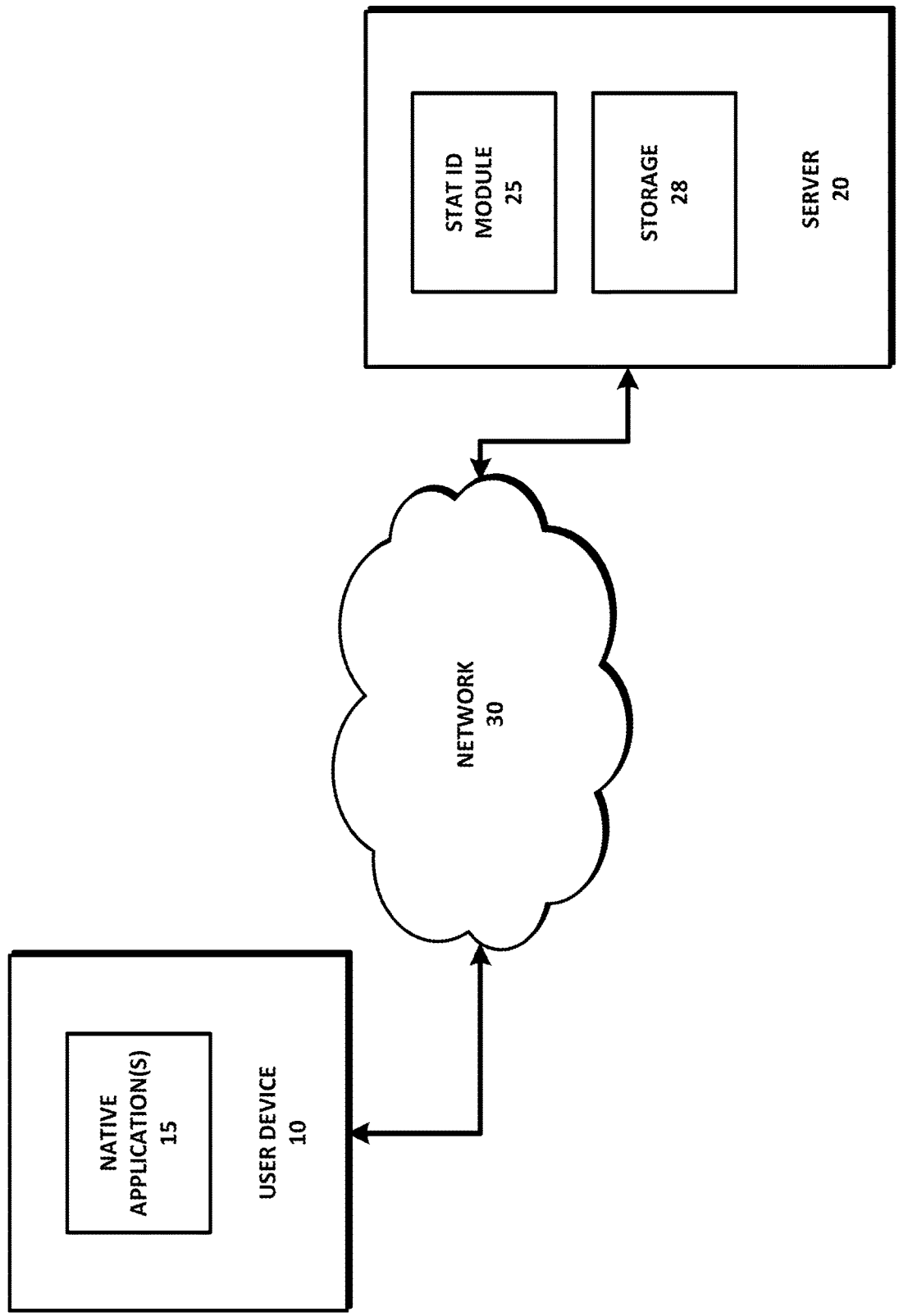
FIG. 1 is a diagram depicting a high-level system architecture according to an implementation.

Described herein in various implementations are systems and methods identifying a device using statistical connections among the native applications of the device. Referring to FIG. 1, in one implementation, one or more native applications 15 are stored and/or execute on a user device 10. The user device can be, for example, a mobile device, a smart phone, tablet computer, smart watch, smart glasses, portable computer, mobile telephone, laptop, palmtop, set-top box, gaming device, music device, television, desktop computer, smart or dumb terminal, network computer, personal digital assistant, router, DVD player, wireless device, information appliance, workstation, minicomputer, mainframe computer, or other computing device, that is operated as a general purpose computer or as a special purpose hardware device that can execute the functionality described herein.

A particular native application 15 can be, for example, a web browser, a mobile app, a game, an application that includes advertisements displayed to the application user, or other application that is capable of establishing communication with a remote server. The application 15 can be implemented in various forms, for example, it can be in the form of a native application, web page, widget, and/or Java, JavaScript, .Net, Silverlight, Flash, and/or other applet or plug-in that is downloaded to the device and runs in conjunction with a web browser. Examples of commercially available web browser software include Microsoft® Internet Explorer®, Google® Chrome®, Mozilla® Firefox®, and Apple® Safari®.

The native applications 15, through the user device 10, can communicate with server 20 via communications network 30. Server 20 can be, for example, an advertising server or other server that can utilize appropriate hardware or software and can execute, for example, on one or more server class computers that have sufficient memory, data storage, and processing power and that run a server class operating system (e.g., Oracle® Solaris®, GNU/Linux®, and the Microsoft® Windows® family of operating systems).

Server 20 can include StatID module 25, which provides statistical identification functionality as further described below. Server software, for example, can be implemented on a general purpose computing device in the form of a computer including a processing unit, a system memory, and a system bus that couples various system components including the system memory to the processing unit. Processors suitable for the execution of a computer program include, by way of example, both general and special purpose microprocessors. Generally, a processor will receive instructions and data from a read-only memory or a random access memory or both. The essential elements of a computer are a processor for executing instructions and one or more memory devices for storing instructions and data. The processor and the memory can be supplemented by, or incorporated in special purpose logic circuitry.

Server 20 can also include storage 28, which StatID module 25 can access for recording and retrieving data relating to connections made between user device 10 and server 20. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

Communication network 30 can include communications media such as standard telephone lines, LAN or WAN links (e.g., T1, T3, 56 kb, X.25), broadband connections (ISDN, Frame Relay, ATM), wireless links (802.11 (Wi-Fi), Bluetooth, GSM, CDMA, etc.), for example. Other communication media are contemplated. The network can carry TCP/IP protocol communications, and HTTP/HTTPS requests made by a web browser, and the connection between the client device and servers can be communicated over such TCP/IP networks. Other communication protocols are contemplated.

Method steps of the techniques described herein can be performed by one or more programmable processors executing one or more computer programs to perform functions by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

The system can also be practiced in distributed computing environments where tasks are performed by remote processing devices that are linked through a communications network. In a distributed computing environment, program modules can be located in both local and remote computer storage media including memory storage devices. Other types of system hardware and software than that described herein can also be used, depending on the capacity of the device and the amount of required data processing capability. The system can also be implemented on one or more virtual machines executing virtualized operating systems such as those mentioned above, and that operate on one or more computers having hardware such as that described herein.

It should also be noted that implementations of the systems and methods can be provided as one or more computer-readable programs embodied on or in one or more articles of manufacture. The program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

In one implementation, server 20 is a server in a secure network that is responsible for scanning and/or processing information regarding connections to the network. The server 20 can use the techniques described herein to perform, for example, intrusion detection and device spoofing identification. More specifically, the server 20 can validate that a device that identifies itself as a known device (e.g., a device that has connected to the network previously in an authorized manner) is likely to actually be that known device, and not another device spoofing the known device.

Figure 2:
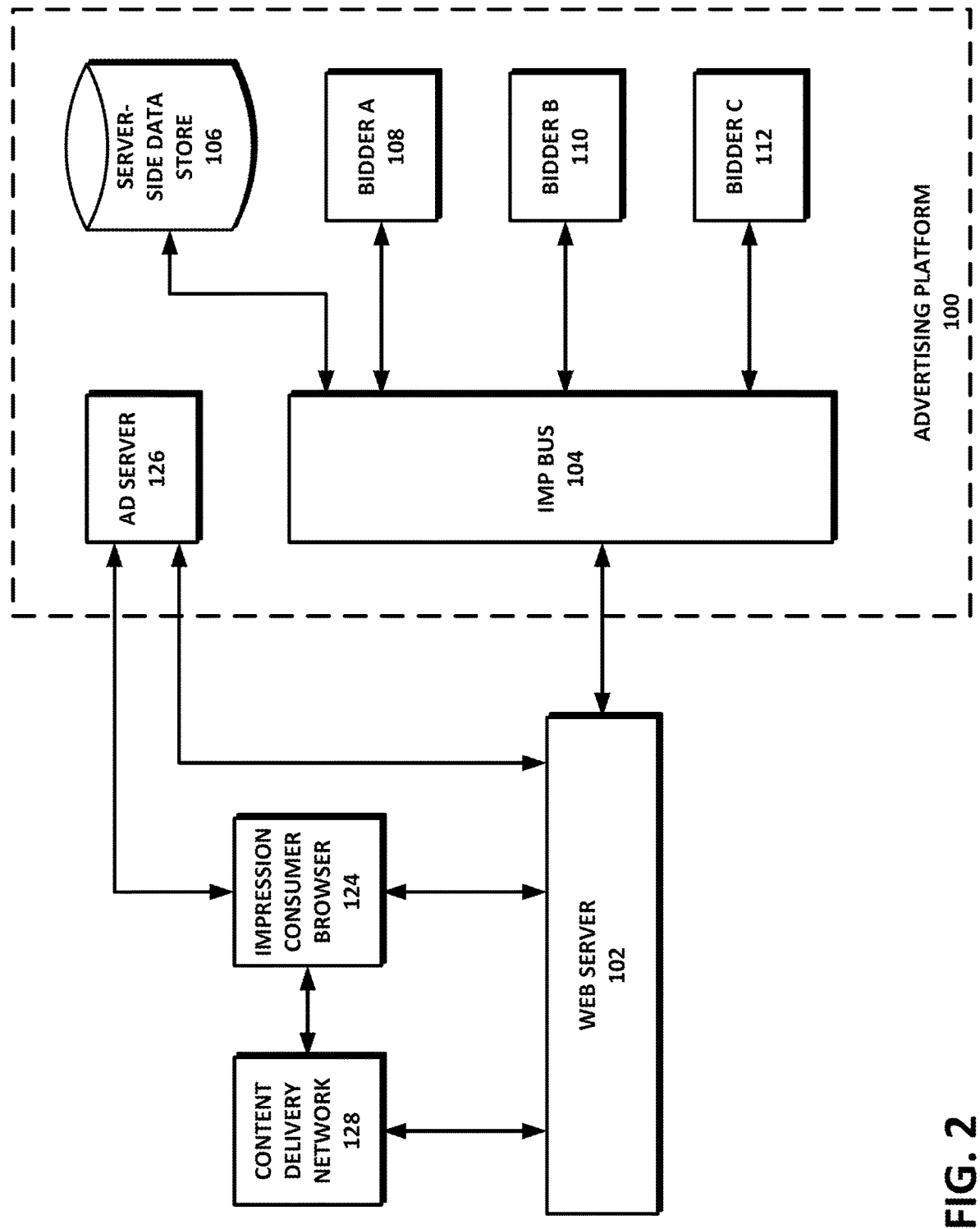
FIG. 2 is a diagram depicting a high-level system architecture including an advertising platform according to an implementation.

In another implementation, server 20 is an advertising server or an online advertising platform server that servers or facilitates the serving of advertisements to an impression consumer (e.g., a user of user device 10). For example, referring to FIG. 2, server 20 can be a server in advertising platform 100. As shown, an advertising platform 100 that provides for the execution of real-time bidding auctions for impression inventory and eases collaboration among members of the online advertising industry can include a platform impression bus 104 (also referred to herein as the "Imp Bus") that facilitates the transactional aspects of impression inventory trading. In general, the Imp Bus 104 processes ad requests, feeds data to platform members, conducts impression auctions, returns ads to publishers, tracks billing and usage, returns auction result data, and enforces quality standards.

Parties that interface with the advertising platform 100 can include impression sellers, which are persons or entities that sell impression inventory (e.g., available ad space on websites, in mobile applications, etc.) and impression buyers, which are persons or entities that purchase impression inventory and can serve creatives (e.g., images, videos, and other forms of advertisements) in the purchased inventory to impression consumers. Impression buyers can include advertisers, advertising networks, advertising agencies, advertising exchanges, and publishers. In an auction for an impression, an impression buyer can bid for the impression using a computer-based bidder that receives as input various data related to the impression, the impression consumer, and/or other data and generates as output a bid price.

In some implementations of the advertising platform 100, a server-side data store 106 within the platform 100 stores data associated with particular impression consumers (e.g., demographics, ad viewing history, etc.), which can be used as input to bidders in impression auctions when a recognized impression consumer is the target audience. In general, data that is stored in association with impression consumers can be supplemented over the course of time as the impression consumers interact with web delivery engines within the platform.

In some implementations, all data stored in association with a particular impression consumer is shared among all parties interfacing with the advertising platform 100, whereas, in other implementations, mechanisms limit access to the data stored in association with a particular impression consumer based on certain criteria. For example, certain impression trading industry members may have contractual agreements that provide for sharing of data stored in association with a particular set (or sets) of impression consumers. In another example, the advertising platform 100 provides functionality that relies on impression consumer data created by or derived from information generated by unrelated parties, but does not permit the data and/or underlying information to be shared among the parties absent other agreement In one implementation of the advertising platform 100, each bidder is assigned a client-side data store (e.g., cookie space) in each impression consumer's browser. A bidder can freely push and pull data into or out of its own client-side data store on each impression or pixel call. For instance, a bidder may wish to track the number of times a creative has been shown to a particular impression consumer or the most recent time an ad was shown to that consumer. The data pushed into a particular bidder's client-side data store is passed into requests for that bidder only, absent an agreement to allow the sharing of data with other bidders.

In one example of operation, an impression seller hosts a website on a web server 102. The website can provide a number of creative serving opportunities, each of which can be associated with a platform-specific ad tag. The web server 102 receives requests for webpages generated by an impression consumer's web browser 124. If a requested page includes one or more creative serving opportunities, the web server 102 makes an ad call to the advertising platform 100 by redirecting the page request to the Imp Bus 104. The Imp Bus 104 can examines a browser header of the page request to determine if information identifying the impression consumer (e.g., an identifier stored in cookie space) is included therein.

If the impression consumer is identified, the Imp Bus 104 can retrieve information associated with the consumer from a server-side data store 106 within the advertising platform 100. The Imp Bus 104 or other platform subsystem generates one or more bid requests that each provide characterizations of one or more of the creative-serving opportunities on the requested page. In general, a particular bid request can include information that characterizes the impression consumer (e.g., based on data retrieved from the server-side data store 106) and the ad space (e.g., based on information associated with the platform-specific ad tag itself, such as data identifying and/or characterizing the impression, the impression seller, or the impression inventory source, and so on). A unique bid request can be created for each bidder or, if sharing of data is permitted between one or more bidders, those bidders can be sent the same bid request.

The Imp Bus 104 sends the bid requests to each respective bidder 108, 110, 112 within the platform 100. The information included in each bid request can be used by each bidder 108, 110, 112 to generate a real-time bid response on behalf of an impression buyer or buyers associated with each bidder 108, 110, 112 and to return bid responses to the Imp Bus 104. Each bid response identifies a bid price and a creative that is to be served to the impression consumer should the bid be identified as the winning bid of the platform-based auction. In the instance where a particular bidder is associated with multiple impression buyers, the bidder can conduct an internal auction to identify a winning bid from amongst the eligible campaigns of its associated impression buyers, and to generate a bid response for the platform-based auction based on the result of the internal auction.

The Imp Bus 104 identifies a winning bid from among the bid responses returned by the bidders 108, 110, 112. Although, in many instances, the winning bid is the bid associated with the highest dollar value, and the best price for a creative serving opportunity is the price that yields the highest revenue for the impression seller, there are instances in which the winning bid and the best price are based on other metrics, such as ad frequency. The Imp Bus 104 returns a uniform resource locator (URL) that identifies the location of a creative associated with the winning bid to the web server 102. In the depicted example, the web server 102 returns the requested page to the impression consumer's web browser 124, which, using information provided in the page, retrieves the ad creative to be served from an ad server 126 within the platform 100 or a server of a content delivery network 128.

Although the present disclosure primarily uses the example of a mobile device communicating with an advertising server, it should be noted that the techniques described herein are similarly applicable to various devices, such as those noted above, in communication with any system that would benefit from consistently recognizing a device that communicates with the system over time.

Figure 3:
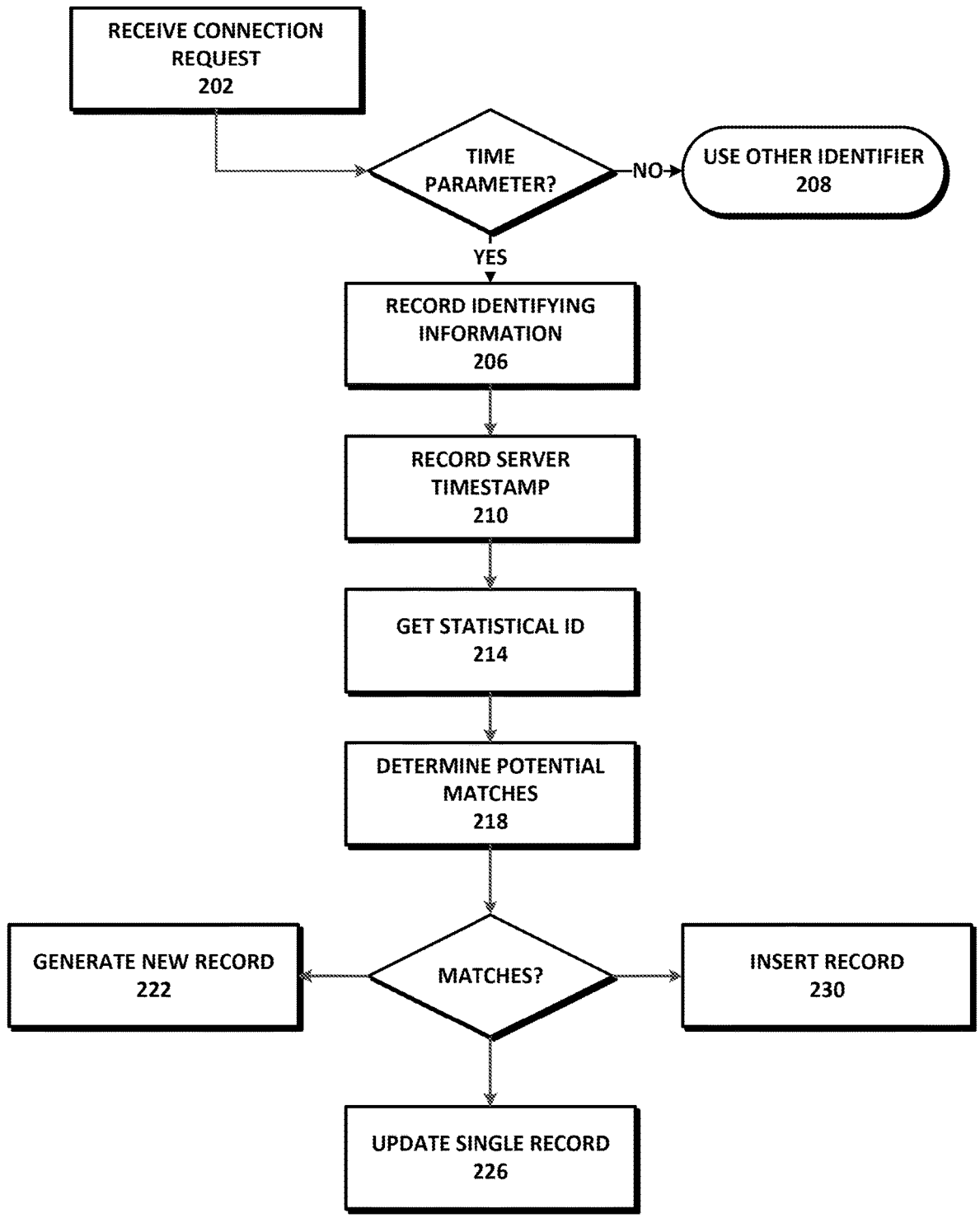
FIG. 3 is a flowchart depicting an method for statistical device identification according to an implementation.

FIG. 3 depicts one implementation of a method for statistical device identification. In STEP 202, server 20 receives a request directly or indirectly from user device 10. As one particular example, a network server directly receives or is forwarded a connection request from a device. As another example, an advertising server receives a request from a mobile device for an advertisement to be served to the mobile device. The request can originate from a native application 15, such as a game, or a web browser running on the device. The request can be transported across HTTP Secure (HTTPS) or non-secure HTTP sessions. Regardless of the originating application or the presence of encryption, the TCP/IP stack of the device 10 can be used to request that a connection/session be established between the device 10 and the server 20. Each TCP connection uses a TCP/IP socket, which uses the well-known three-way handshake to establish a socket to the ad server. In other implementations, other protocols are used for communications between the device 10 and server 20.

Upon receiving the first SYN packet/segment of the three-way handshake of the session being established, the server 20 inspects the SYN packet and determines whether it contains a TCP Timestamps Option (TSopt) parameter (as defined in RFC 1323 and, more recently, in RFC 7323, TCP Extensions for High Performance). If the SYN packet includes a TSopt parameter, the server 20 records identifying information associated with the source device 10 (STEP 206). The identifying information can include the originating IP address and associated TCP source and/or destination port number, and the Timestamp Value (TSval) field value of the TSopt parameter in the TCP packet received from the device 10. If, on the other hand, the packet does not include a TSopt or other value parameter, or if the connection is from a proxy that alters or removes the timestamp field, the server 20 can attempt to use a different technique to identify the device 10 (END 208). In other implementations in which other protocols are used, the timestamp information can be included in a standard or custom header, or in the data portion of a particular segment, datagram, or other form of packet.

In STEP 210, at some point during or after establishing the connection., the server 20 can generate and record a timestamp reflecting the current time of the server 20. In one instance, the foregoing recordation process occurs in parallel to the socket establishment (three way handshake).

When the socket completes the connection, the device 10 can make a request for data (e.g., a request for an ad to be served to the device 10) or engage in other communication with the server 20 over HTTP/HTTPS. The server 20 can then use the IP address and the associated TCP source and/or destination port number used by the source device 10 to locate the TSval record previously recorded during the arrival of the SYN packet. The server 20 uses the TSval record and, in some implementations, also uses HTTP headers and/or device-type unique identifiers presented by the mobile device to query the StatID module 25 for a statistical identifier of the user session (STEP 214).

The TSval record can include identifying information such as the originating IP address of the device 10, the TSval value from the TCP packet received from the device 10, and the timestamp generated by the server 20. The HTTP headers can include, for example, User-Agent, Language, Accepts and other headers presented by the application 15 making the request. The device-type unique identifiers can include identifiers such as those available from the HTML5 engine, including device pixel ratio, screen height and width, and locale information such as time zone offset. It is to be appreciated that there can be various other identifiers that can be used alone or in combination in the present techniques to assist in recognizing a device.

In one implementation., the StatID module 25 maintains a time-ordered list of records for each established connection (e.g., each previous ad request). Each record can include the TSval from the source TCP packet, the source device IP address, HTTP headers and the device-type unique identifiers such as those indicated above, and a statistically unique identifier (e.g., a random 128-bit number). Other combinations of identifying information can be used. The StatID module 25 can also maintain a list of known TSval increment frequencies; typically, mobile operating systems use a value of 1 KHz or 100 Hz. The StatID module 25 normalizes an incoming TSval value to a constant time base by multiplying or dividing by the known increment frequency conversion value to achieve a consistent time base for the TSval value that matches the time stamp resolution of the server 20. A typical time base to use is 1 KHz.

In STEP 214, when the StatID module 25 is queried with an IP address, server timestamp, TSval, the device-specific (i.e., non-application specific) HTTP header values, and/or the device-type unique identifiers (or other identifier or combination of identifiers), the module 25 can perform an operation to determine a statistically unique identifier for the device. In one instance, the device-unique HTTP header values and/or device-type unique identifiers (or other identifier(s)) are used to create a unique key referred to herein the "DevID," which is representative of a category of devices. A category of devices can be a group of devices that share one or more software, hardware, configuration, location, and/or other attributes, e.g., iPhone 6 located in the US in the EST time zone, with iOS 8, and using English as the default locale. Upon determining the DevID for an incoming request, the server 20 can check some or all previously created records having the same DevID against the incoming request to match the condition that the TSval is valid (as further described below). This operation can be bound in time to only look at the last 'X' hours or days (e.g., the storage of records may be time-limited).

In STEP 218, the server 20 makes a determination, based on the identifying information and the current timestamp of the server 20, of a likelihood that a previous connection (e.g., an ad request) was initiated from the same source as the current connection request. In one implementation, in which INC refers to the incoming TSval record, the determination is performed as shown in the equations below. For each record, R, in the time-ordered list of records having the same DevID, the server 20 calculates the following:

$$INC(TSval) - R(TSval) > 0 \quad (1)$$

$$\frac{INC(TSval) - R(TSval)}{INC(\text{timestamp}) - R(\text{timestamp})} > \text{THRESHOLD} \quad (2)$$

where INC (TSval) is the TSval value associated with the incoming record, R (TSval) is the TSval value associated with an existing record being tested, INC (timestamp) is the server timestamp associated with the incoming record, and R (timestamp) is the server timestamp associated with the existing record being tested.

If the conditions in Equations 1 and 2 are true, then the incoming TSval record, INC, can be considered a potential match to an existing record, R. In some implementations, the value of the left side of Equation 2 must also be greater or equal to one. In other implementations, the numerator and denominator of the left side of Equation 2 are exchanged if the numerator is greater than the denominator. The value of THRESHOLD determines the amount of error allowed (a typical value would be 0.95). THRESHOLD can be a constant or a variable value. If variable, THRESHOLD can be a function of delta real time, e.g., a value subject to exponential decay, which would account for devices that enter deep sleep and do not increment the timer value injected into the TSval field.

STEP 218 yields a set of R-values (records) having a DevID that matches the DevID of the incoming request, INC, and that represent potential previous instances of contact with the server 20 by the device 10 that generated the incoming request, INC. For example, in the case of ad requests, this set can include previously seen ad requests that were potentially received from the device 10 that made the current incoming ad request, INC.

In some implementations, applying an IP address resolution process to exclude competitive communication service providers and/or performing geographic exclusion techniques further reduces the set of R-values. More specifically, if a device IP address can be resolved to a mobile carrier's cellular service, this generally (but not absolutely) implies that the device is bound to a person that has a contract with that carrier. It follows then that the device would not be associated with a competing carrier. As one example, the server 20 observes over time three IP addresses from connecting devices, all of which are iPhones running iOS 8.1 and located in the US. The first IP address resolves to AT&T 4G network, the second resolves to the Verizon 4G network, and the third resolves to the Comcast network. Whereas the first and second IP address are unlikely to be associated with the same device (because they are competing carriers), the device associated with the third IP address is a potential match for the device associated with the first or second IP address, because it is possible that the Comcast IP address represents the AT&T or Verizon phone connecting on a Wi-Fi network. It is to be appreciated, however, that there can be situations when the first and second IP addresses could be associated with the same address (e.g., if the AT&T phone connects to a Wi-Fi network that is routed to the internet through Verizon's 4G network).

The remaining sets of R-values are those that statistically match the incoming request, INC. If the set of R-values is empty, a new unique device identifier can be generated and the record, INC, is add to the list of records having the same DevID (STEP 222). If the R-values set contains a single element, the record for that element can be updated with the TSval parameters from INC (i.e., the incoming record is assigned the same statistical identifier as the existing record) (STEP 226). If the R-values set contains more than one record, the TSval parameters from INC can be inserted into the list of time-ordered records for the DevID, with references to the records in R (STEP 230). The record(s) can then be used by the server 20, as described above, to recognize the device 10 when the device 10 communicates with the server 20 at a later time.

Accordingly, in the context of network security, an unrecognized device may be considered an intruder or may appear to be spoofing another device, and appropriate action can be taken. In the context of advertising, by recognizing the device, targeted advertising can be provided to the device in a more accurate fashion (e.g., accounting for the device user's characteristics, previously seen ads, and so on).

While various implementations of the present invention have been described herein, it should be understood that they have been presented by example only. For example, the techniques described herein can be used in contexts and environments other than online advertising, such as for network security purposes (e.g., intrusion detection, identifying device spoofing, catching replay attacks). Further, in some implementations, the present methods and apparatus can be used to statistically identify various types of devices that provide identifying information, via software, firmware, and/or hardware over a network interface, that is usable with the above-described techniques.

The terms and expressions employed herein are used as terms and expressions of description and not of limitation, and there is no intention, in the use of such terms and expressions, of excluding any equivalents of the features shown and described or portions thereof. In addition, having described certain implementations in the present disclosure, it will be apparent to those of ordinary skill in the art that other implementations incorporating the concepts disclosed herein can be used without departing from the spirit and scope of the invention. The features and functions of the various implementations can be arranged in various combinations and permutations, and all are considered to be within the scope of the disclosed invention. Accordingly, the described implementations are to be considered in all respects as illustrative and not restrictive. The configurations, materials, and dimensions described herein are also intended as illustrative and in no way limiting. Similarly, although physical explanations have been provided for explanatory purposes, there is no intent to be bound by any particular theory or mechanism, or to limit the claims in accordance therewith.

What is claimed is:

1. A method for mobile device identification, the method comprising:
   receiving, at a server of a processing system including a processor, a request to establish a connection with the server from a source device;
   receiving, by the processing system, identifying information associated with the source device, the identifying information comprising a timestamp generated by the source device and a device-type unique identifier;
   determining, by the processing system, a statistically unique identifier of the source device according to the identifying information;
   retrieving, by the processing system, a stored record of a previous connection associated with the statistically unique identifier of the source, wherein the stored record of the previous connection comprises a timestamp generated by a source of a request to establish the previous connection; and
   determining, by the processing system, based on the identifying information, the stored record of the previous connection and a current timestamp of the server, a likelihood that the previous connection associated with the statistically unique identifier was made between the source device and the server,
   wherein determining the likelihood comprises determining whether a ratio of a first difference between the timestamp generated by the source device and the timestamp generated by the source of the request to establish the previous connection, and a second difference between the current timestamp of the server and a timestamp generated by the server in response to the request to establish the previous connection, exceeds a threshold, and
   wherein the threshold comprises a variable value subject to exponential decay.

2. The method of claim 1, wherein the source device is a mobile device; and wherein the device-type unique identifier comprises one of a pixel-ratio, a screen height and width, locale information, a time zone offset, or any combination thereof.

3. The method of claim 1, wherein the identifying information is provided in one or more TCP header fields.

4. The method of claim 1, wherein the identifying information is provided in one or more TCP SYN packets.

5. The method of claim 1, wherein the identifying information further comprises at least one of an IP address, a port number, and a plurality of HTTP headers, and wherein the device-type unique identifier is based on an HTTP header of the plurality of HTTP headers.

6. The method of claim 5, further comprising:
generating, by the processing system, a device identifier to obtain a generated device identifier based on at least one of the HTTP headers and at least the device-type unique identifier; and
storing, by the processing system, the identifying information and the current timestamp in association with the generated device identifier.

7. The method of claim 6, further comprising storing, by the processing system, records of previously established connections, each record comprising a device identifier, a timestamp generated by a source of a particular request to establish a connection, resulting in a requested connection, and a timestamp generated by the server in response to receiving the particular request.

8. The method of claim 7, wherein determining the likelihood further comprises, for each record having a device identifier equal to the generated device identifier, determining, by the processing system, whether an alignment between the timestamps associated with the record and timestamps associated with the requested connection exceeds a threshold value, wherein the timestamps associated with the requested connection comprise the timestamp generated by the source device and the current timestamp of the server.

9. The method of claim 1, wherein the server further comprises an advertising server; and
wherein the request to establish a connection further comprises a request for an advertisement to be served; and
wherein the likelihood that a previous connection was made further comprises a likelihood that a previous request for an advertisement to be served was received from the source device.

10. A system for mobile device identification, the system comprising:
a processing system including a processor; and
a memory that stores executable instructions that, when executed by the processing system, facilitate performance of operations, the operations comprising:
receiving, at a server, a request to establish a connection with the server from a source device;
receiving identifying information associated with the source device, the identifying information comprising a timestamp generated by the source device and a device-type unique identifier;
determining a statistically unique identifier of the source device according to the identifying information;
obtaining a stored record of a previous connection associated with the statistically unique identifier of the source, wherein the stored record of the previous connection comprises a timestamp generated by a source of a request to establish the previous connection; and
determining, based on the identifying information, the stored record of the previous connection and a current timestamp of the server, a likelihood that the previous connection associated with the statistically unique identifier was made between the source device and the server,
wherein determining the likelihood comprises determining whether a ratio of a first difference between the timestamp generated by the source device and the timestamp generated by the source of the request to establish the previous connection and a second difference between the current timestamp of the server and a timestamp generated by the server in response to the request to establish the previous connection exceeds a threshold, and
wherein the threshold comprises a variable value subject to exponential decay.

11. The system of claim 10, wherein the source device is a mobile device.

12. The system of claim 10, wherein the identifying information is provided in one or more TCP header fields.

13. The system of claim 10, wherein the identifying information is provided in one or more TCP SYN packets.

14. The system of claim 10, wherein the identifying information further comprises at least one of an IP address, a port number, and a plurality of HTTP headers, and wherein the device-type unique identifier is based on an HTTP header of the plurality of HTTP headers.

15. The system of claim 14, wherein the operations further comprise:
generating a device identifier to obtain a generated device identifier based on at least one of the HTTP headers and at least the device-type unique identifier; and
storing the identifying information and the current timestamp in association with the generated device identifier.

16. The system of claim 15, wherein the operations further comprise storing records of previously established connections, each record comprising a device identifier, a timestamp generated by a source of a particular request to establish a connection, resulting in a requested connection, and a timestamp generated by the server in response to receiving the particular request.

17. The system of claim 16, wherein determining the likelihood further comprises, for each record having a device identifier equal to the generated device identifier, determining whether an alignment between the timestamps associated with the record and timestamps associated with the requested connection exceeds a threshold value, wherein the timestamps associated with the requested connection further comprise the timestamp generated by the source device and the current timestamp of the server.

18. The system of claim 10, wherein the server further comprises an advertising server; and
wherein the request to establish a connection further comprises a request for an advertisement to be served; and wherein the likelihood that a previous connection was made comprises a likelihood that a previous request for an advertisement to be served was received from the source device.

19. The method of claim 1, further comprising:
storing, by the processing system, a set of records of previously established connections to the server; and
generating, by the processing system, a subset of the set of records by determining, based on the identifying information and a current timestamp of the server, which records in the set of records meet a threshold likelihood that a previous connection was made between the source device and the server.

20. The method of claim 1, further comprising normalizing, by the processing system, the timestamp generated by the source device to a constant time base matching a timestamp resolution of the server by multiplying or dividing by an increment frequency conversion value.

21. The method of claim 6, wherein the generated device identifier further represents a category of devices rather than an individual device.

* * * * *